United States Patent [19]

Stiles et al.

[11] Patent Number: 5,589,241
[45] Date of Patent: Dec. 31, 1996

[54] FUEL TANK HAVING AN INTEGRALLLY MOLDED PERMEATION BARRIER

[75] Inventors: Ernest D. Stiles, St. Clair Shores; Dale L. Hartsock, Livonia, both of Mich.

[73] Assignee: Ford Motor Company, Dearborn, Mich.

[21] Appl. No.: 990,497

[22] Filed: Dec. 14, 1992

[51] Int. Cl.⁶ ........................................................ B65D 1/26
[52] U.S. Cl. .................... 428/36.9; 428/36.91; 428/35.8; 428/457; 428/35.9; 220/415; 220/450; 220/454; 220/455; 220/905
[58] Field of Search .............................. 428/36.9, 36.91, 428/35.8, 35.9, 457; 220/415, 450, 454, 455, 905

[56] References Cited

U.S. PATENT DOCUMENTS

| | | | |
|---|---|---|---|
| 3,613,957 | 10/1971 | Walles | 220/64 |
| 3,655,086 | 4/1972 | Trenner | 220/454 |
| 3,916,048 | 10/1975 | Walles | 428/35.9 |
| 4,101,045 | 7/1978 | Roberts et al. | 220/461 |
| 4,403,010 | 9/1983 | Festag et al. | 428/35.9 |
| 4,559,257 | 12/1985 | Nilsson | 428/35.9 |
| 4,734,303 | 3/1988 | Fujiwara et al. | 428/35.9 |
| 4,760,949 | 8/1988 | Elias | 428/35.9 |
| 4,909,411 | 3/1990 | Uchida et al. | 428/35.9 |
| 5,079,052 | 1/1992 | Heyes et al. | 428/35.9 |

FOREIGN PATENT DOCUMENTS 63-92432  4/1988  Japan .

OTHER PUBLICATIONS

NASA Tech Briefs, Dec. 1991.

*Primary Examiner*—William Watkins
*Attorney, Agent, or Firm*—Donald A. Wilkinson

[57] ABSTRACT

A polymeric container having a permeation retardant laminate welded to a surface of the container. The laminate comprises a polymeric carrier film and a permeation retardant coating applied to the carrier film. The carrier film welds to the container material to form an integral composite structure. The container may be produced by a method wherein a heated polymeric material is extruded within a mold. Laminate is dispensed adjacent hot polymeric material. The hot polymeric material softens the polymeric film carrier causing the two to weld together.

3 Claims, 2 Drawing Sheets

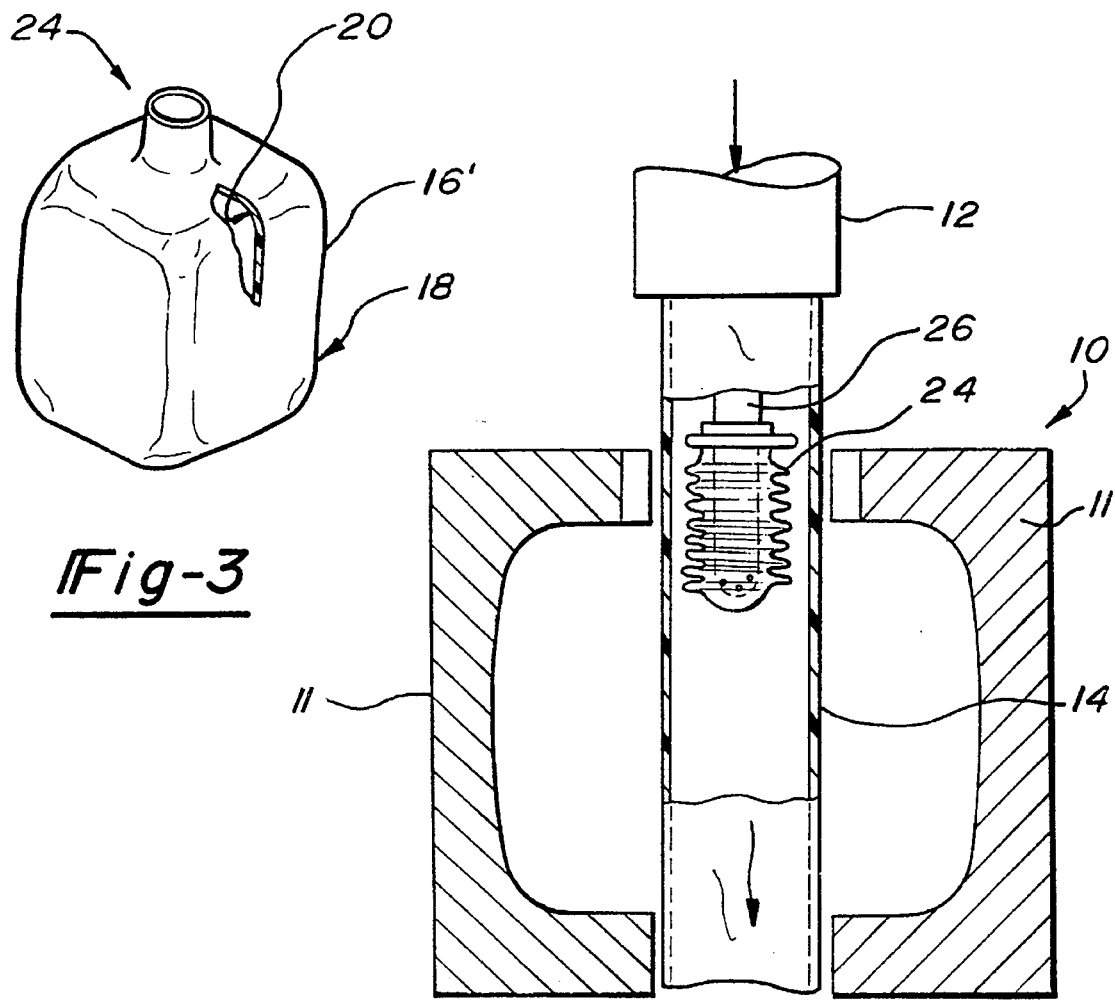
Fig-3
Fig-4
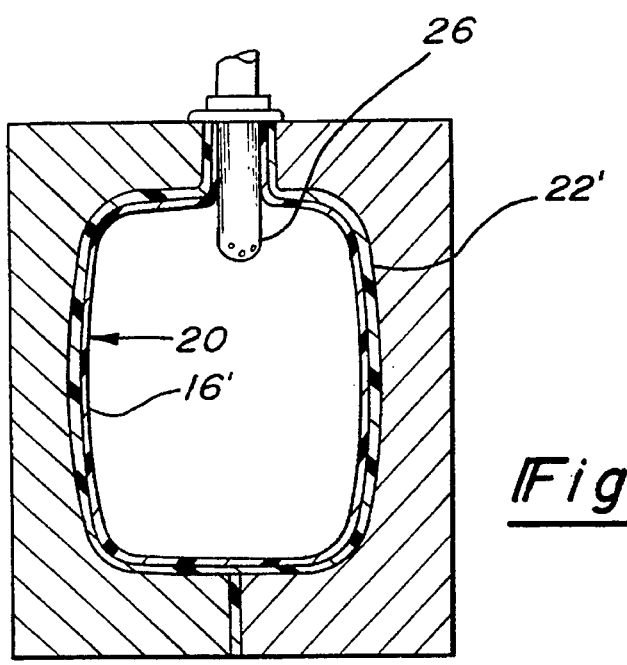
Fig-5

FUEL TANK HAVING AN INTEGRALLLY MOLDED PERMEATION BARRIER

FIELD OF THE INVENTION

The present invention relates to a method of manufacturing a container having an integrally molded permeation resistant barrier. More specifically the invention relates to a method of blow molding a fuel tank having a permeation resistant layer.

BACKGROUND OF THE INVENTION

It is desirable to have containers be resistant to the permeation of gases or liquids. Containers used as fuel tanks are susceptible to permeation when made from polymeric material such as polyethylene. It is desirable to reduce the amount of permeation from gasoline constituent components. Various methods currently exist to treat the polymeric material to resist permeation such as fluorine gas.

Metal films provide good permeation resistance to gases. However, metal films do not adhere well to polymeric materials. Japanese patent 63-92432 teaches a ruptured metal layer intermediate two plastic layers for use as a fuel tank. The ruptured portion between the metal layer provides a passage for the polymeric materials to bond to one another. The Japanese process is difficult to mold and does not provide a strong wall structure, and cannot provide complete coverage of a surface.

It is desirable to have an easily moldable wall having a permeation resistant coating on one or more surfaces thereof. It is also desirable that this method be easily automated to enable large volume manufacturing.

SUMMARY OF THE INVENTION

The present invention teaches a polymeric container having a permeation retardant laminate welded to a surface of the container. The laminate comprises a polymeric carrier film and a permeation retardant coating applied to the carrier. The carrier film welds to the container material to form an integral composite structure.

The container may be produced by a method whereby a heated polymeric material is extruded within a mold. Laminate is dispensed adjacent the polymeric material and caused to contact hot polymeric material. The hot polymeric material softens the polymeric film carrier causing the two to weld together.

BRIEF DESCRIPTION OF THE DRAWINGS

FIG. 3 is a perspective view, partially broken away of a bag-shapped laminate for lining the interior of a container.

FIGS. 4 and 5 are cross-sectional views of an alternative embodiment of the invention using the bag of FIG. 3.

DETAILED DESCRIPTION OF THE PREFERRED EMBODIMENTS

Figure 1:
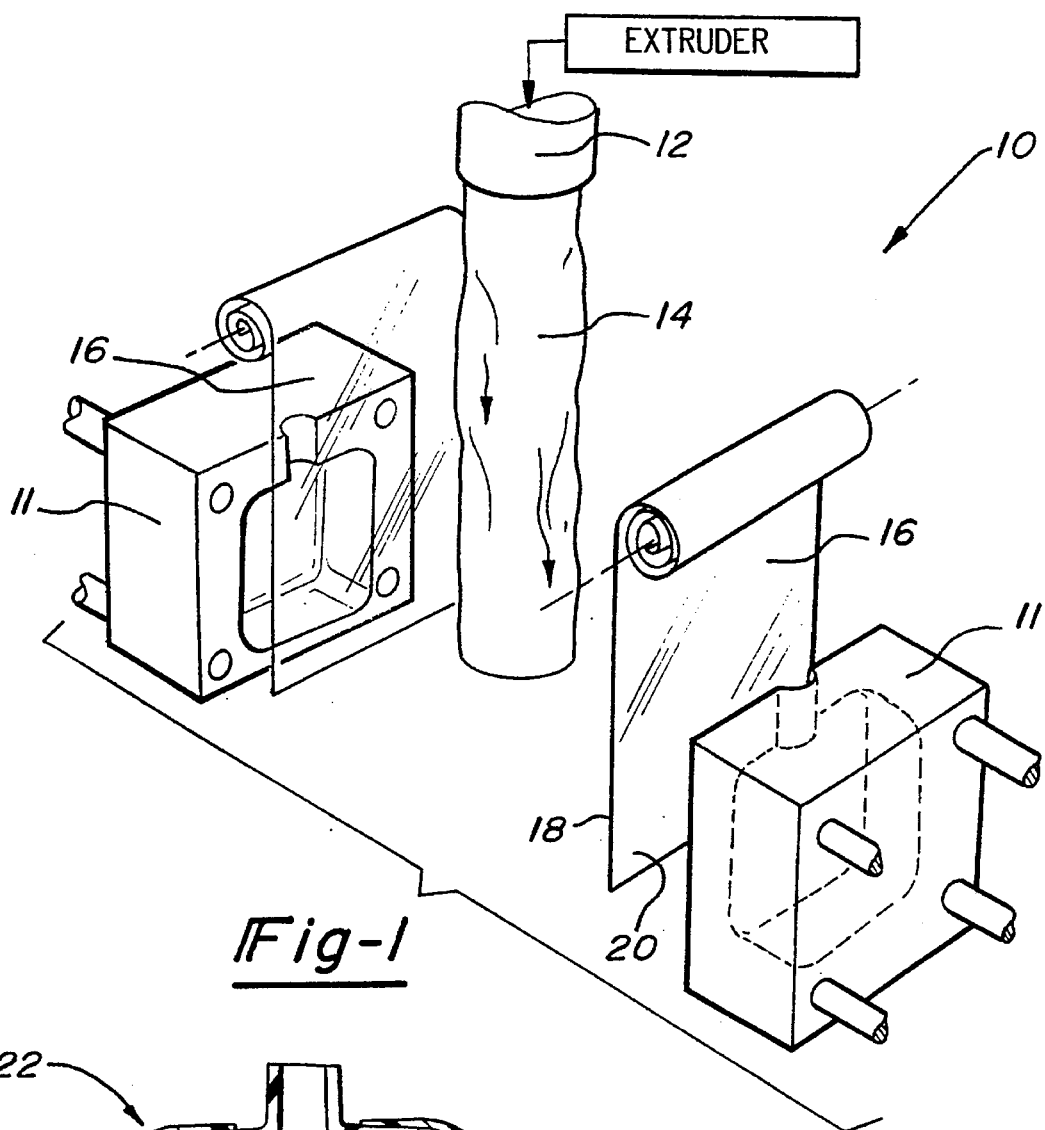
FIG. 1 is an exploded view of a forming mold opposed an extruded parison and two laminate sheets.
Figure 2:
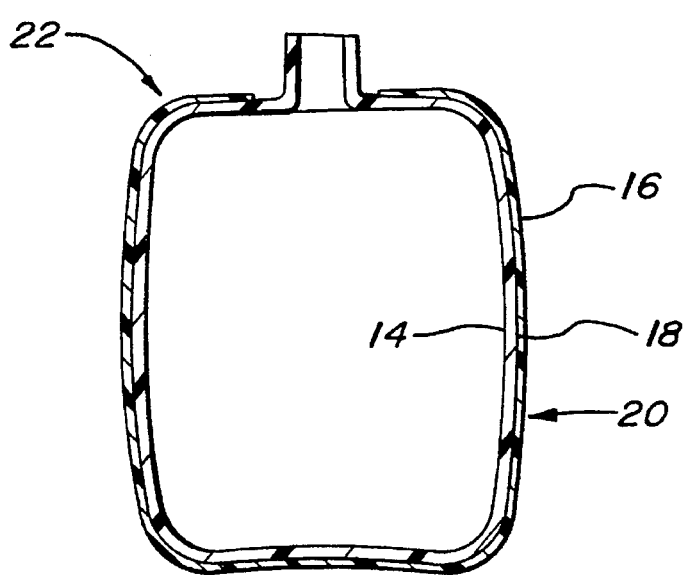
FIG. 2 is a cross-sectional view of a molded container having a laminate welded to its exterior surface.

The invention contemplates the manufacture of a container having a laminate welded thereto. The laminate may be welded either to the interior or to the exterior of the container. Illustrated in the figures is a method of blow molding containers such as automotive fuel tanks. Other methods of molding containers are also contemplated in the present invention which utilize heated polymeric material such as injection molding, compression molding or stamping. Illustrated in FIGS. 1 and 2 is a method of blow molding an automotive fuel tank from a polymeric material having a laminate welded to an exterior surface. Mold 10 comprises opposing dies 11 forming the exterior surface of the container. Extruder 12 extrudes a hot pliable parison 14 between dies 11. A flat sheet of laminate 16 is dispensed from a rolled coil. Laminate 16 is dispensed between parison 14 and dies 11. It is anticipated that the coil of laminate 16 is placed above mold 10 and indexed an amount sufficient to completely cover the interior surface of dies 11. The width of laminate 16 should slightly exceed the width of dies 11 so as to permit an excess of laminate 16 beyond the perimeter of dies 11.

Laminate 16 comprises a polymeric carrier film 18 and a permeation retardant coating 20 deposited atop carrier film 18. A variety of polymeric materials are suitable as carrier films. Particularly preferred is polyethylene terephthalate, referred to as Mylar. Other thermoplastic films compatible with and weldable to parison 14 are also possible. Welding, as used herein, means the commingling or blending of materials while in a heated state to form an integral union when cooled and a strong attachment between the materials.

In general, compatible materials suitable for welding include materials having the same or similar molecular structure. Solid polymers can generally be described as either amorphous or crystalline. Amorphous materials generally are susceptible to being blended with one another under appropriate temperatures and contact pressures to form a strong weld. The same is true for crystalline materials, however, crystalline and amorphous materials do not blend well without the aid of compatiblizers. Therefore, mixed materials are generally not preferred for welding to one another absent an intermediate layer which bonds to both materials. Automotive fuel tanks are generally made from high density polyethylene parison. Polyethylene is an amorphous material as is polyethylene terephthalate. These two materials are capable of forming a strong weld between one another.

Carrier film 18 has deposited onto it a coating of permeation retardant material. Various types of permeation retardant materials exist and are known in the art such as aluminum and ceramic. One ceramic which has been used to form permeation retardant coatings in the food packaging industry is silicon oxide. Laminate 16 is dispensed adjacent dies 11 with carrier film 18 juxtaposed parison 14. Mold 10 is closed, sealing the bottom of parison 14 and severing laminate 16 about the periphery of dies 11. Parison 14 is inflated and forced in contact with laminate 16. Parison 14 and laminate 16 conform to the interior surface of dies 11 and form a composite structure in the shape of container 22. Polymeric material from parison 14 is heated to an elevated temperature sufficient to soften and weld to carrier film 18. Once container 22 cools, the polymeric material of parison 14 solidifies and forms a strong weld with laminate 16. Permeation coating 20 prevents or reduces the permeation of fluid from within container 22. The entire exterior surface of container 22 need not be covered with laminate 16 to provide permeation resistance. Partial coverage of the exterior surface of container 22 provides partial permeation resistance. This partial permeation resistance may be sufficient in some cases to render the container desirable for an intended purpose.

In other instances, it is desirable to have laminate 16 cover the interior surface of the container. When used in blow molding, it is difficult to use sheet or plainer laminate materials. In this instance, it is useful to form the laminate into a bag-like shape conforming with the interior surface of a container. Illustrated in FIGS. 3–5 is a method of forming a container having its interior surface lined with a laminate. Laminate 16' is formed into a bag-like shape 24 which conforms to the interior surface of container 22'. Bag 24 is folded into a compact shape and placed around blow pin 26. Parison 14 is extruded within mold 10. Bag 24 is partially inflated and unfolded within parison 14. Continued inflation causes bag 24 to contact parison 14' and force parison 14 to conform with the interior surface of dies 11. Permeation coating 20 is placed atop the interior surface of bag 24. Container 22' is removed from mold 10 and has an interior lining of laminate 16'.

Lining the interior surface of a container is useful for permeation resistance as well as solvent solubility of the container. Polymeric materials are susceptible to dissolving in certain solvents or solutions. By lining the interior of a container with a laminate having an aluminum or ceramic coating, the container may be suitable for holding materials which would other wise damage the polymeric material.

The invention has been described as a method of blow-molding a container having a laminate surface bonded thereto. Other variations such as compression molding, stamping, and injection molding are within the scope of the present invention and the appended claims.

We claim:

1. A blow-molded polymeric fuel tank having a permeation retardant laminate on a surface of said tank, said laminate consisting of a polymeric carrier film having first and second surfaces and an uninterrupted permeation retardant coating applied to said first surface of said film, said second surface of said film being welded to said tank surface.

2. The tank of claim 1, wherein said laminate is welded to the exterior surface of said tank.

3. The tank of claim 1, wherein said laminate is welded to the interior surface of said tank.

* * * * *